United States Patent
Miller et al.

(10) Patent No.: US 12,017,487 B2
(45) Date of Patent: Jun. 25, 2024

(54) WHEEL ASSEMBLY WITH TORQUE BAR BRACKET RIBS

(71) Applicant: GOODRICH CORPORATION, Charlotte, NC (US)

(72) Inventors: Jerry Miller, Kettering, OH (US); Nathaniel John Herrmann, Springfield, OH (US); Jay G. Peterson, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 802 days.

(21) Appl. No.: 17/116,908

(22) Filed: Dec. 9, 2020

(65) Prior Publication Data

US 2022/0176759 A1    Jun. 9, 2022

(51) Int. Cl.
| | | |
|---|---|---|
| *B60C 23/18* | (2006.01) | |
| *B64C 25/36* | (2006.01) | |
| *B64C 25/42* | (2006.01) | |
| *F16D 65/78* | (2006.01) | |

(52) U.S. Cl.
CPC .............. *B60C 23/18* (2013.01); *B64C 25/36* (2013.01); *B64C 25/42* (2013.01); *F16D 65/78* (2013.01); *B60B 2900/513* (2013.01)

(58) Field of Classification Search
CPC ... B60C 23/18; B60B 2900/513; B64C 25/36; B64C 25/42; F16D 2055/0037; F16D 2065/785; F16D 65/78; B60T 8/1703
USPC .................................................... 301/6.2, 6.9
See application file for complete search history.

(56) References Cited

U.S. PATENT DOCUMENTS

| | | | | |
|---|---|---|---|---|
| 4,017,123 A * | 4/1977 | Horner | ................... | B60C 23/18 188/264 G |
| 5,851,056 A * | 12/1998 | Hyde | ..................... | B60B 19/10 188/264 G |
| 6,615,958 B1 * | 9/2003 | Baden | .................. | F16D 65/847 188/264 AA |
| 7,546,910 B2 | 6/2009 | Thorp et al. | | |

(Continued)

FOREIGN PATENT DOCUMENTS

| | | | | |
|---|---|---|---|---|
| EP | 1780057 | | 5/2007 | |
| EP | 1780057 A2 * | | 5/2007 | ............. F16D 55/36 |

OTHER PUBLICATIONS

European Patent Office; Extended European Search Report dated Feb. 28, 2022 in Application No. 21207493.4.

*Primary Examiner* — S. Joseph Morano
*Assistant Examiner* — Eva L Comino
(74) *Attorney, Agent, or Firm* — SNELL & WILMER L.L.P.

(57) ABSTRACT

A retainer assembly may comprise: a retainer main body having a first mounting flange, a second mounting flange, a body portion, a first rib and a second rib, the body portion extending from the first mounting flange to the second mounting flange, the first rib extending from the second mounting flange towards the first mounting flange, the second rib extending from the second mounting flange towards the first mounting flange, the first rib and the second rib extending orthogonal to the body portion; and a retainer sleeve having a first slot extending from the first axial end towards the second axial end and a second slot extending from the first axial end towards the second axial end, a portion of the first rib disposed in the first slot, and a portion of the second rib disposed in the second slot.

18 Claims, 7 Drawing Sheets

(56) References Cited

U.S. PATENT DOCUMENTS

| | | | |
|---|---|---|---|
| 2009/0277260 A1* | 11/2009 | Enright | F16D 65/78 73/115.07 |
| 2010/0025172 A1* | 2/2010 | Campbell | F16D 65/12 188/264 G |
| 2015/0308526 A1* | 10/2015 | Swank | F16D 65/02 419/53 |
| 2020/0189727 A1* | 6/2020 | French | F16D 65/0081 |
| 2020/0298965 A1* | 9/2020 | Francis | F16D 65/847 |

\* cited by examiner

WHEEL ASSEMBLY WITH TORQUE BAR BRACKET RIBS

FIELD

The present disclosure relates to wheels, and more specifically, to wheel assemblies with heat shield retainers.

BACKGROUND

Aircraft typically utilize brake systems or mechanisms on wheels to slow or stop the aircraft during landings, taxiing and emergency situations, such as, for example, a rejected takeoff (RTO), which generally refers to application of a brake mechanism during an aborted takeoff and involves high braking loads over a short time period, resulting in a rapid increase in the brake temperature. A brake mechanism generally employs a heat sink comprising a series of friction disks, sandwiched between a pressure plate and an end plate, that may be forced into sliding contact with one another during a brake application to slow or stop the aircraft. Under various conditions, such brake applications may generate high temperatures and frictional loads throughout the heat sink and particularly on the surfaces of the stators and rotors and the pressure plate and the end plate that comprise the heat sink.

Torque bars—also known as torque transmitting bars, lugs or beams—are employed in aircraft wheel and brake systems to couple the wheels to the rotors of the brake mechanism. A torque bar typically extends parallel to a central axis extending through a wheel axle and has an outboard end inserted into an aperture formed in a web of the wheel and an inboard end attached to a radially inner side of the wheel at the inboard end of the wheel. The inboard end of the torque bar may be attached to the wheel by a fastener, such as, for example, a bolt, that extends in a direction that is generally perpendicular to the central axis. To minimize thermal conduction from the brake mechanism to the wheel rim, the inboard and central portions of the torque bar may be spaced in a radial direction from the well of the wheel, creating an annular space configured to house a heat shield.

SUMMARY

A retainer assembly for use in a wheel assembly is disclosed herein. The retainer assembly may comprise: a retainer main body having a first mounting flange, a second mounting flange, a body portion, a first rib and a second rib, the body portion extending from the first mounting flange to the second mounting flange, the first rib extending from the second mounting flange towards the first mounting flange, the second rib extending from the second mounting flange towards the first mounting flange, the first rib and the second rib extending orthogonal to the body portion; a retainer sleeve having a flat plate extending from a first axial end to a second axial end, the retainer sleeve having a first slot extending from the first axial end towards the second axial end and a second slot extending from the first axial end towards the second axial end, a portion of the first rib disposed in the first slot, and a portion of the second rib disposed in the second slot.

In various embodiments, the first rib and the second rib are configured to provide stiffness to the retainer assembly, and the first slot and the second slot are sized and configured to provide substantially similar insulation properties for the retainer sleeve relative to a retainer sleeve without slots. A plurality of wing segments may be coupled to the retainer main body on a radial side opposite the retainer sleeve. The retainer sleeve may further comprise: a first axially extending hook disposed on a first circumferential side of the flat plate and extending from the first axial end to the second axial end; a second axially extending hook disposed on a second circumferential side of the flat plat and extending from the first axial end to the second axial end, the second circumferential side opposite the first circumferential side, wherein: the first axially extending hook defines a first groove and the second axially extending hook defines a second groove, and the first groove and the second groove configured to receive the body portion of the retainer main body. The retainer main body may further comprises a first flange extending circumferentially from a first circumferential side of the body portion and a second flange extending circumferentially from a second circumferential side of the body portion, the second circumferential side opposite the first circumferential side, the first flange may be disposed in the first groove, and the second flange may be disposed in the second groove. The retainer assembly may further comprise: a first wing segment and a second wing segment disposed on a first circumferential side of the retainer main body, the first wing segment spaced apart axially from the second wing segment; and a third wing segment and a fourth wing segment disposed on a second circumferential side of the retainer main body, the third wing segment spaced apart axially from the second wing segment, the second circumferential side opposite the first circumferential side.

A wheel assembly is disclosed herein. The wheel assembly may comprise: a wheel including an inner wheel half; a torque bar coupled to an outboard end of the inner wheel half and coupled axially to an inboard end of the inner wheel half; a retainer assembly disposed between the torque bar and the inner wheel half, the retainer assembly comprising: a retainer main body having a body portion, a first mounting flange coupled to the inner wheel half at the outboard end, a second mounting flange coupled to the inner wheel half at the inboard end, the body portion extending axially from the first mounting flange to the second mounting flange, a first rib extending axially from the second mounting flange towards the first mounting flange and orthogonally from a first circumferential side of the body portion, and a second rib extending axially from the second mounting flange towards the first mounting flange and orthogonally from a second circumferential side of the body portion; and a retainer sleeve coupled to the retainer main body, the retainer sleeve having a first axial slot and a second axial slot, the first rib disposed in the first axial slot, the second rib disposed in the second axial slot.

In various embodiments, a flat plate of the retainer sleeve is disposed radially between the retainer main body and the torque bar. The retainer assembly may be separated from a radially inner surface of the inner wheel half by a gap, and the retainer assembly may be configured to deflect less than the gap during operation of the wheel assembly. The wheel assembly may further comprise a first heat shield segment and a second heat shield segment, wherein the first heat shield segment is retained radially by the retainer assembly and the second heat shield segment is retainer radially by the retainer assembly. The first rib and the second rib may be configured to provide stiffness to the retainer assembly, the axial first slot and the second axial slot are sized and configured to provide substantially similar insulation properties for the retainer sleeve relative to a retainer sleeve without slots. A plurality of wing segments may be coupled to the retainer main body on a radial side opposite the retainer sleeve. The retainer sleeve may further comprise: a flat plate extending from a first axial end to a second axial end, the axial first slot extending from the first axial end towards the second axial end and the axial second slot extending from the first axial end towards the second axial end, a portion of the first rib disposed in the first axial slot, and a portion of the second rib disposed in the second axial slot; a first axially extending hook disposed on a first circumferential side of the flat plate and extending from the first axial end to the second axial end, and a second axially extending hook disposed on a second circumferential side of the flat plat and extending from the first axial end to the second axial end, the second circumferential side opposite the first circumferential side. The retainer assembly may further comprise: a first wing segment and a second wing segment disposed on a first circumferential side of the retainer main body, the first wing segment spaced apart axially from the second wing segment; and a third wing segment and a fourth wing segment disposed on a second circumferential side of the retainer main body, the third wing segment spaced apart axially from the second wing segment, the second circumferential side opposite the first circumferential side.

A system for retaining adjacent heat shield segments is disclosed herein. The system may comprise: an inner wheel half; a first heat shield segment disposed radially inward from the inner wheel half; a second heat shield segment disposed radially inward form the inner wheel half; a retainer assembly disposed circumferentially between the first heat shield segment and the second heat shield segment, the retainer assembly, comprising: a retainer main body including: a first mounting flange coupled to the inner wheel half proximate an outboard end of the inner wheel half; a second mounting flange coupled axially to the inner wheel half proximate an inboard end of the inner wheel half; a body portion extending from the first mounting flange to the second mounting flange; a first rib extending axially from the second mounting flange towards the first mounting flange and orthogonally from the body portion proximate the first heat shield segment; and a second rib extending axially from the second mounting flange towards the first mounting flange and orthogonally from the body portion proximate the second heat shield segment; and a retainer sleeve having a flat plate disposed radially inward of the body portion, the flat plate including a first slot with a portion of the first rib disposed therein and a second slot with a portion of the second rib disposed therein.

In various embodiments, the system may further comprise a torque bar disposed radially inward of the retainer assembly. The torque bar may be coupled to the inner wheel half by a fastener extending through the first mounting flange and the second mounting flange into a boss of the inner wheel half. The flat plate of the retainer sleeve may be disposed radially between the retainer main body and the torque bar. The retainer assembly may be separated from a radially inner surface of the inner wheel half by a gap, and the retainer assembly may be configured to deflect less than the gap during operation of a wheel assembly for the system. The retainer assembly may further comprise: a first wing segment and a second wing segment disposed on a first circumferential side of the retainer main body, the first wing segment spaced apart axially from the second wing segment; and a third wing segment and a fourth wing segment disposed on a second circumferential side of the retainer main body, the third wing segment spaced apart axially from the second wing segment, the second circumferential side opposite the first circumferential side.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1A:
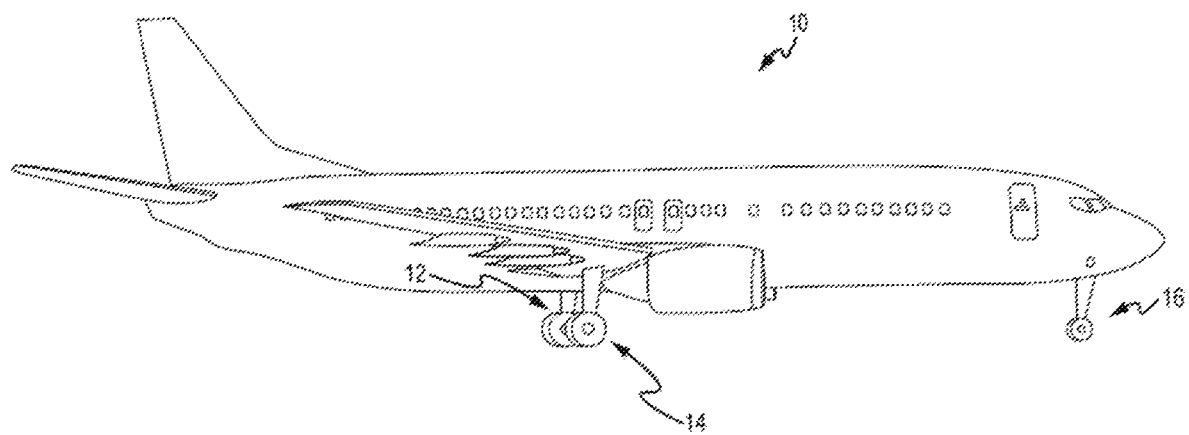
FIG. 1A illustrates a side view of an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Provided herein, according to various embodiments, is a wheel assembly. The wheel assembly comprises a wheel having a rim and a radial protrusion extending radially outward from the rim. An aperture may be disposed through the radial protrusion to a radially inner surface of the rim. A fuse plug may be disposed in the aperture. The fuse plug may be disposed radially outward from a radially inner surface of the rim or flush with the radially inner surface of the rim. In this regard, the fuse plug may be spaced apart from a heat shield disposed radially inward from the radially inner surface of the rim. In various embodiments, the wheel assembly may be configured to provide enhanced thermal protection proximate the fuse plug. In various embodiments, the wheel assembly may decrease a cost and/or complexity of a heat shield for the wheel assembly.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations.

Figure 1B:
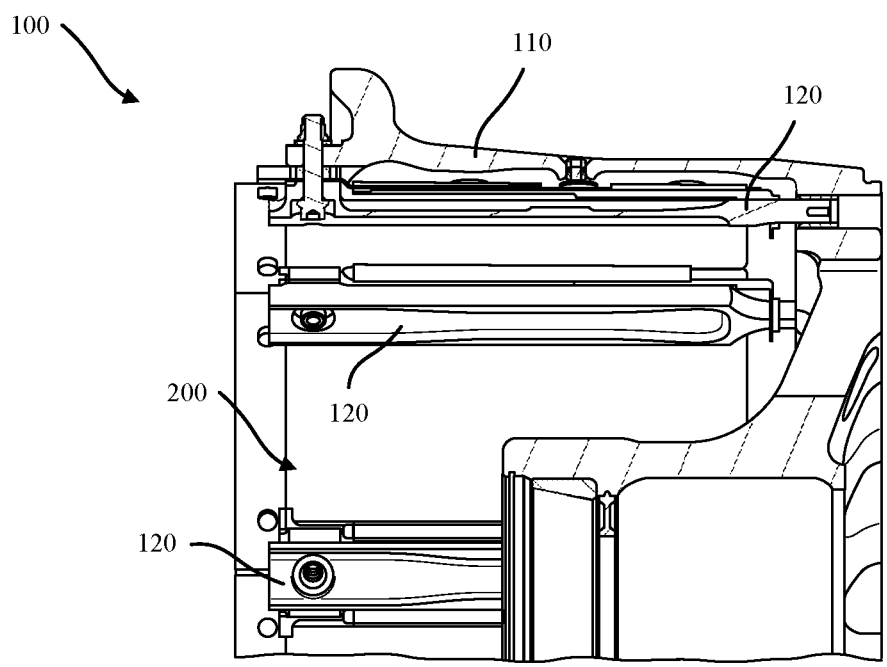
FIG. 1B illustrates a cross-sectional view of a wheel assembly, in accordance with various embodiments.

Referring now to FIG. 1B, a cross-sectional view of a portion of a wheel assembly 100 (e.g., for use in left main landing gear 12, right main landing gear 14, and/or nose landing gear 16) is illustrated, in accordance with various embodiments. In various embodiments, the wheel assembly 100 comprises an inner wheel half 110, a plurality of torque bars 120, and a heat shield arrangement 200. The plurality of torque bars 120 are spaced circumferentially about a radial inner surface of the inner wheel half 110. Each torque bar in the plurality of torque bars 120 is coupled to a radially inner surface of the inner wheel half 110 on a proximal end of the wheel assembly 100. In various embodiments, each torque bar in the plurality of torque bars 120 extends axially from the proximal end to a distal end of the wheel assembly 100. Each torque bar in the plurality of torque bars 120 may be coupled to an axial surface of the inner wheel half 110 at the distal end of the wheel assembly 100. In various embodiments, the plurality of torque bars 120 are configured to transmitting torque between the inner wheel half 110 and rotors from a brake system.

In various embodiments, the heat shield arrangement 200 is disposed radially between the inner wheel half 110 and the plurality of torque bars 120. In this regard, the heat shield arrangement 200 is configured to prevent conduction and radiation to the inner wheel half 110 from brake disks during a braking event. In various embodiments, the heat shield arrangement 200 may also prevent hot brake material ejected from the brake disks during braking from being slung against a radially inner surface of the inner wheel half, which could potentially cause damage to the inner wheel half 110.

Figure 2:
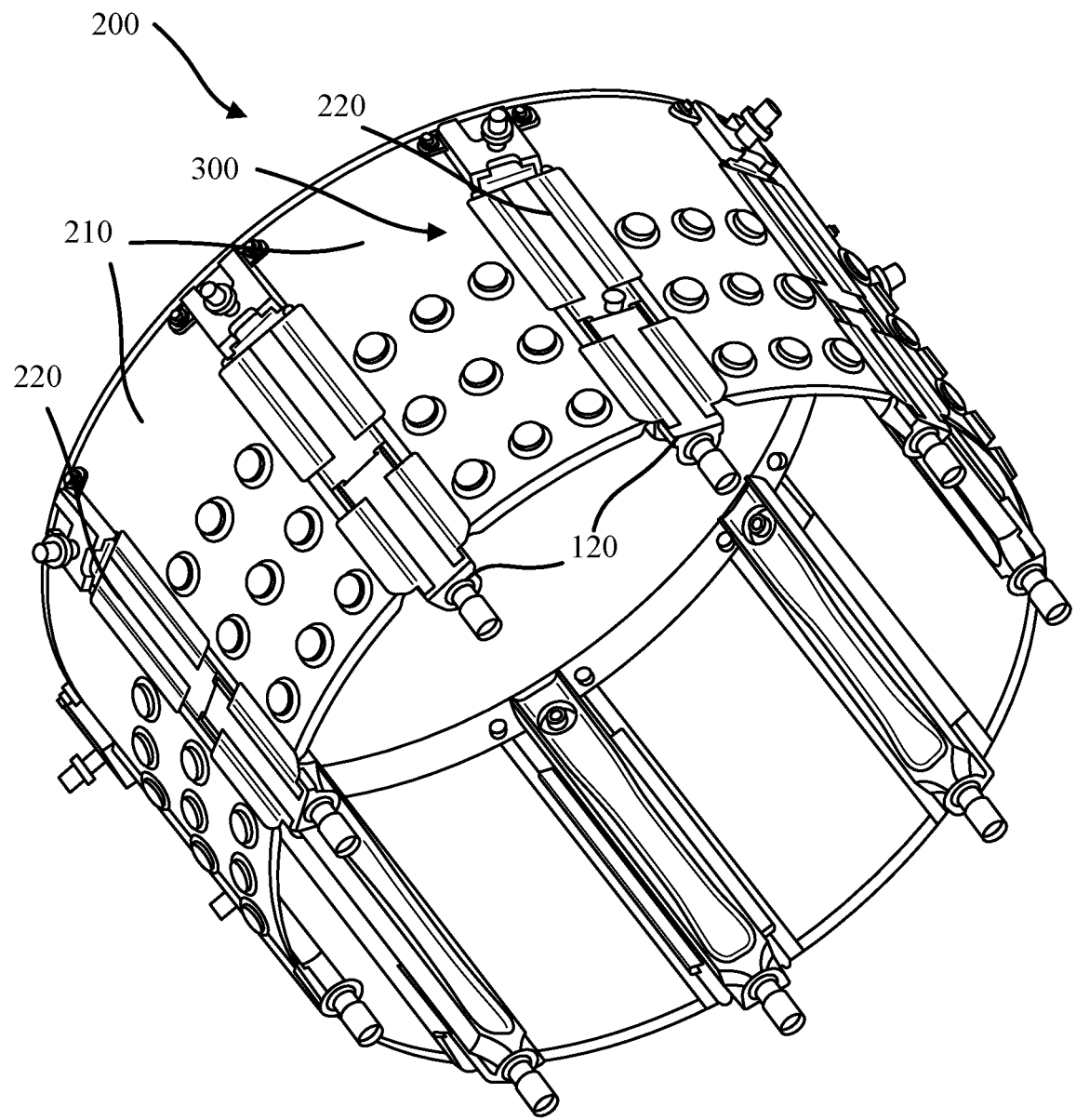
FIG. 2 illustrates a heat shield arrangement for a wheel assembly, in accordance with various embodiments.

Referring now to FIG. 2, a perspective view of the heat shield arrangement 200 with the plurality of torque bars 120 is illustrated, in accordance with various embodiments. In various embodiments, the heat shield arrangement 200 includes a plurality of heat shield segments 210 disposed circumferentially around the inner wheel half 110 from FIG. 1B. In various embodiments, the heat shield arrangement 200 further comprises a plurality of heat shield retainer assemblies 220 disposed circumferentially between adjacent heat shield segments in the plurality of heat shield segments 210. In various embodiments, a heat shield retainer assembly 300 in the plurality of heat shield retainer assemblies 220 is disposed radially between a respective torque bar in the plurality of torque bars 120 and the inner wheel half 110 from FIG. 1B. The heat shield retainer assembly 300 is configured to retain adjacent heat shield segments in the plurality of heat shield segments 210 and maintain a thermal barrier between a respective torque bar and inner wheel half 110 from FIG. 1B, in accordance with various embodiments.

In various embodiments, the heat shield retainer assembly 300 may comprise a plurality of sheet metal brackets. The heat shield retainer assembly 300 may be susceptible to centrifugal loading and modal responses due to having a large unsupported area between a first mounting location and a second mounting location. In this regard, the heat shield retainer assembly 300 may experience radial deflections between mounting locations without additional stiffness.

Figure 3A:
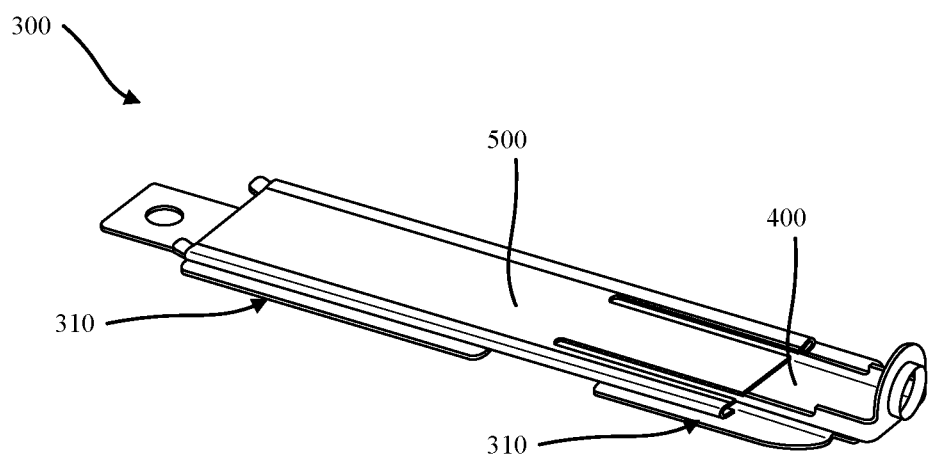
FIG. 3A illustrates retainer assembly for use in a heat shield arrangement, in accordance with various embodiments.

Referring now to FIG. 3A, a perspective view of a heat shield retainer assembly 300, in accordance with various embodiments, is illustrated. In various embodiments, the heat shield retainer assembly 300 comprises a retainer main body 400, a retainer sleeve 500, a plurality of wing segments 310. In various embodiments, the retainer main body 400 is configured to couple to the inner wheel half 110 from FIG. 1B to the radially inner surface of the inner wheel half 110 at a proximal end of the wheel assembly 100 from FIG. 1B, and the retainer sleeve 500 is configured to act as a heat shield between a respective torque bar in the plurality of torque bars 120 from FIGS. 1 and 2.

In various embodiments, the retainer sleeve 500 may be loosely coupled to the retainer main body 400. In this regard, the retainer sleeve 500 and the retainer main body 400 may be assembled more efficiently and without the additional cost of welding, brazing or the like, as described further herein.

Figure 3B:
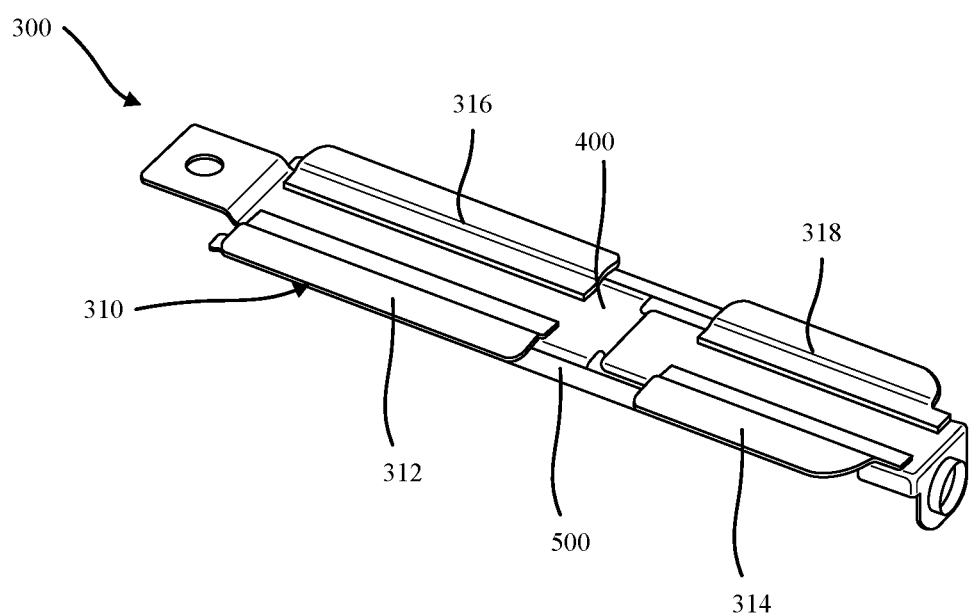
FIG. 3B illustrates retainer assembly for use in a heat shield arrangement, in accordance with various embodiments.

Referring now to FIG. 3B, a perspective view of an opposite side of the heat shield retainer assembly 300 from FIG. 3A is illustrated, in accordance with various embodiments. In various embodiments, the plurality of wing segments 310 are coupled to the retainer main body 400 on a first circumferential side and on a second circumferential side opposite the first circumferential side. The plurality of wing segments 310 and the retainer sleeve 500 may define a channel for a respective heat shield segment in the plurality of heat shield segments 210 from FIG. 2 to slide into. In this regard, each heat shield segment in the plurality of heat shield segments 210 from FIG. 2 may be retained radially by the heat shield retainer assembly 300, in accordance with various embodiments.

In various embodiments, a first wing segment 312 and a second wing segment 314 may be disposed on a first circumferential side of the retainer main body 400. In various embodiments, the first wing segment 312 may be spaced apart axially from the second wing segment 314. In this regard, the first wing segment 312 and the second wing segment 314 may allow for additional clearance to components in close proximity to the first wing segment 312 and the second wing segment 314, in accordance with various embodiments. Thus, by having a discontinuous wing segment (e.g., wing segment 312 separated from wing segment 314), a nearby component may have greater tolerances, resulting in a less expensive component, in accordance with various embodiments. Similarly, a third wing segment 316 and a fourth wing segment 318 may be disposed on a second circumferential side of the retainer main body 400 and spaced apart axially in a manner similar to the first circumferential side of the retainer main body 400, in accordance with various embodiments. In various embodiments, by having the discontinuous wing segment (e.g., wing segment 312 separated from wing segment 314), a radial clearance between the retainer main body 400 and the inner wheel half 110 from FIG. 1B may be increased, preventing radial deflections from centrifugal loading from causing the heat shield retainer assembly from contacting the inner wheel half 110 from FIG. 1B.

Figure 4:
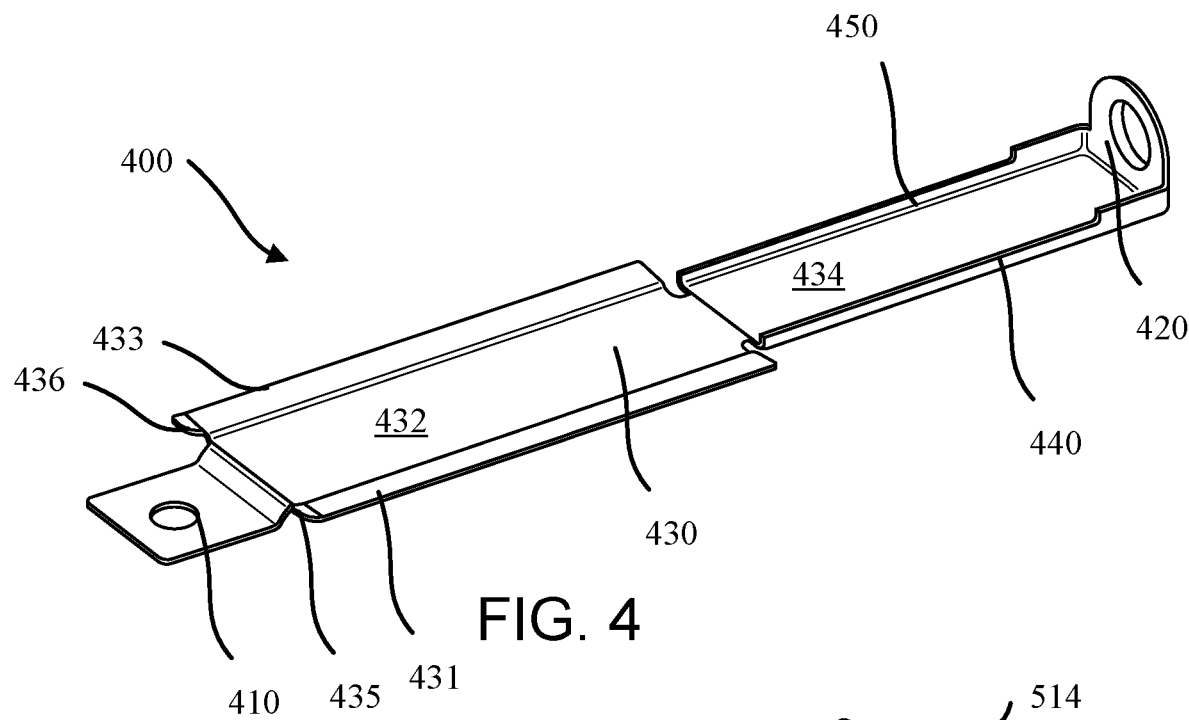
FIG. 4 illustrates a retainer main body for a retainer assembly, in accordance with various embodiments.

Referring now to FIG. 4, a perspective view of the retainer main body 400 for a heat shield retainer assembly 300 from FIGS. 3A-3B is illustrated, in accordance with various embodiments. In various embodiments, the retainer main body 400 comprises a first mounting flange 410 and a second mounting flange 420. In various embodiments, the first mounting flange 410 is disposed in a radial direction, and the second mounting flange 420 is aligned in an axial direction. In various embodiments, the retainer main body 400 includes a body portion 430 extending axially from the first mounting flange 410 to the second mounting flange 420.

The body portion 430 may include a first flat portion 432 and a second flat portion 434. The first flat portion 432 is disposed proximate the first mounting flange 410 and the second flat portion 434 is disposed axially between the first flat portion 432 and the second mounting flange 420. In various embodiments, the first flat portion 432 and the second flat portion 434 are aligned in a radial direction when installed. In various embodiments, the first flat portion 432 is configured to receive the retainer sleeve 500 from FIGS. 3A-3B thereover. In various embodiments, the first flat portion 432 includes a first flange 431 extending circumferentially from the first flat portion 432 on a first circumferential end of the first flat portion 432 and a second flange 433 extending circumferentially from the first flat portion 432 on a second circumferential end. In various embodiments, the first flange 431 includes a first tab 435 disposed proximate the first mounting flange 410 and the second flange 433 includes a second tab 436 disposed proximate the first mounting flange 410 and distal to the second mounting flange 420. The first tab 435 and the second tab 436 are configured to retain the retainer sleeve 500 in an axial direction when assembled on wheel assembly 100 from FIG. 1B.

In various embodiments, the retainer main body 400 further comprises a first rib 440 and a second rib 450. The first rib 440 extends axially from the second mounting flange 420 to a point proximal the second flat portion 434 of the body portion 430 of the retainer main body. Similarly, the second rib 450 extends axially from the second mounting flange 420 to a point proximal the second flat portion 434 on an opposite circumferential end of the second flat portion 434 of the body portion 430 of the retainer main body. In various embodiments, the first rib 440 and the second rib 450 extend orthogonally from the first flat portion 432 on opposite circumferential ends. In various embodiments, the first rib 440 and the second rib 450 have a first height proximate the second mounting flange 420 and a second height distal to the second mounting flange 420. The first height being greater than the second height may provide greater stiffness proximate the second mounting flange 420. In various embodiments, as will be described further herein, the first rib 440 and the second rib 450 may extend axially past an axial end of the retainer sleeve 500 from FIG. 4 (e.g., the retainer sleeve 500 may be configured to receive the first rib 440 and the second rib 450). In various embodiments, the ribs 440, 450 may include this additional length to prevent a modal response and significant radial deflection due to centrifugal loading of the heat shield retainer assembly 300 from FIGS. 3A-3B within an operating range of a wheel assembly 100 from FIG. 1B. In this regard, the heat shield retainer assembly 300 from FIGS. 3A-3B may be configured to have radial deflections between the first mounting flange 410 and the second mounting flange 420 that is less than a gap between the heat shield retainer assembly 300 and the inner wheel half 110 from FIG. 1B.

Figure 5:
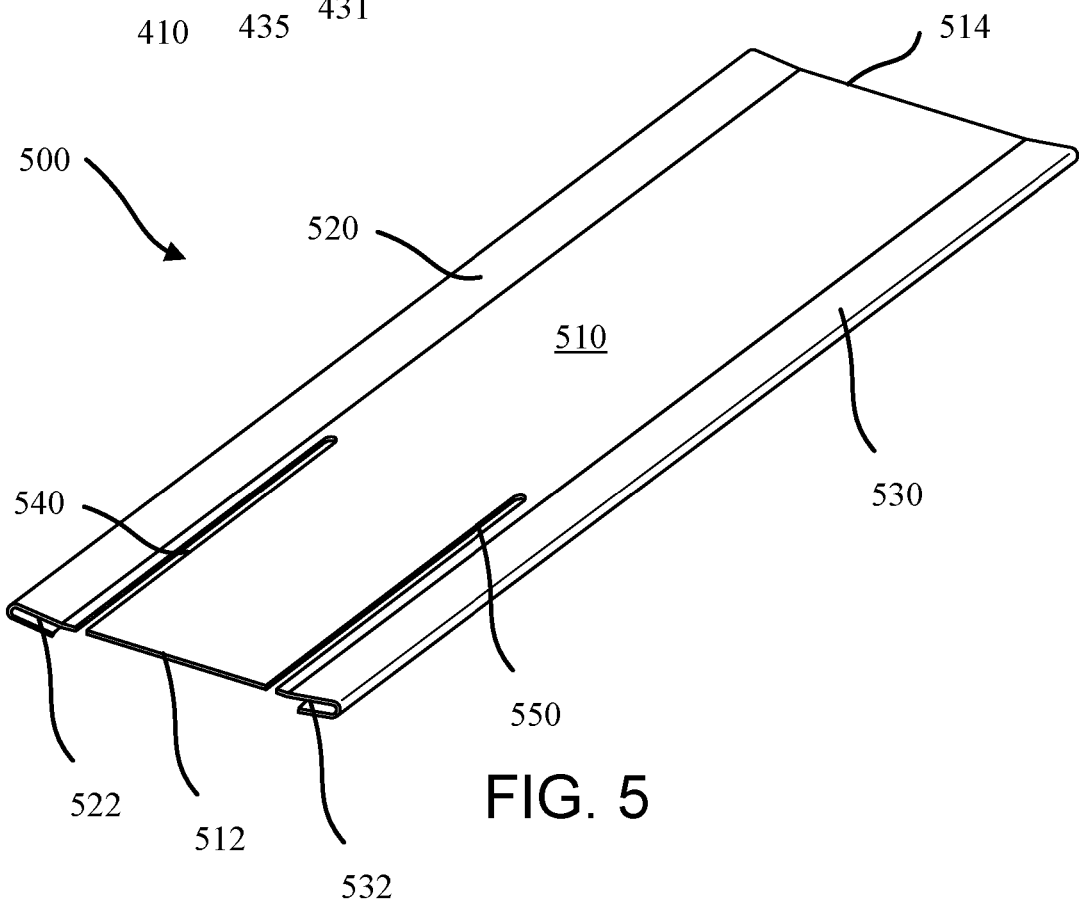
FIG. 5 illustrates a retainer sleeve for a retainer assembly, in accordance with various embodiments.

Referring now to FIG. 5, a perspective view of a retainer sleeve 500 for a heat shield retainer assembly 300 from FIGS. 3A-3B is illustrated, in accordance with various embodiments. In various embodiments, the retainer sleeve comprises a flat plate 510 extending axially from a first axial end 512 to a second axial end 514. In an installed position, the flat plate 510 may act as a heat shield and be oriented in a radial direction, in accordance with various embodiments. In this regard, the retainer sleeve 500 is configured to provide a thermal barrier between a respective torque bar in the plurality of torque bars 120 and the inner wheel half 110 of the wheel assembly 100 from FIG. 1B.

In various embodiments, the retainer sleeve 500 further comprises a first axially extending hook 520 extending axially from the first axial end 512 to the second axial end 514 on a first circumferential side of the flat plate 510. Similarly, the retainer sleeve 500 comprises a second axially extending hook 530 extending axially from the first axial end 512 to the second axial end 514 on a second circumferential side. The second circumferential side is opposite the first circumferential side. The first axially extending hook 520 may define a first groove 522 and the second axially extending hook 530 may comprise a second groove 532. The first groove 522 may be configured to receive the first flange 431 of the retainer main body 400 from FIG. 4. Similarly, the second groove 532 may be configured to receive the second flange 433 of the retainer main body 400 from FIG. 4. In this regard, the first axially extending hook 520 and the second axially extending hook 530 are configured to retain the retainer sleeve 500 in a radial direction relative to the retainer main body 400. In this regard, the retainer sleeve 500 may not need a physical coupling to prevent the retainer sleeve 500 from moving in the radial direction during operation due to the first axially extending hook 520 and the second axially extending hook 530. In various embodiments, the first tab 435 and the second tab 436 may be configured to retain the retainer sleeve at the second axial end 514 of the retainer sleeve 500 by being bent radially outward.

In various embodiments, the retainer sleeve 500 further comprises a first axially extending slot 540 extending axially from the first axial end 512 of the flat plate 510 and a second axially extending slot 550 extending axially from the first axial end 512 on an opposite circumferential side from the first axially extending slot 540. In various embodiments, the first axially extending slot 540 is configured to receive a portion of the first rib 440 of the retainer main body 400 and the second axially extending slot 550 is configured to receive a portion of the second rib 450. In this regard, the first rib 440 and the second rib 450 may be extended past the first axial end 512 of the retainer body further towards the second axial end 514 and provide additional stiffness to the heat shield retainer assembly 300, in accordance with various embodiments. In various embodiments, the first axially extending slot 540 and the second axially extending slot 550 are sized and configured to receive a portion of the first rib 440 and a portion of the second rib 450 while maintaining substantially similar insulation properties relative to a retainer sleeve without slots. In this regard, the retainer sleeve 500 may still act as a heat shield for the torque bar 122 from FIG. 1B, in accordance with various embodiments.

Figure 6:
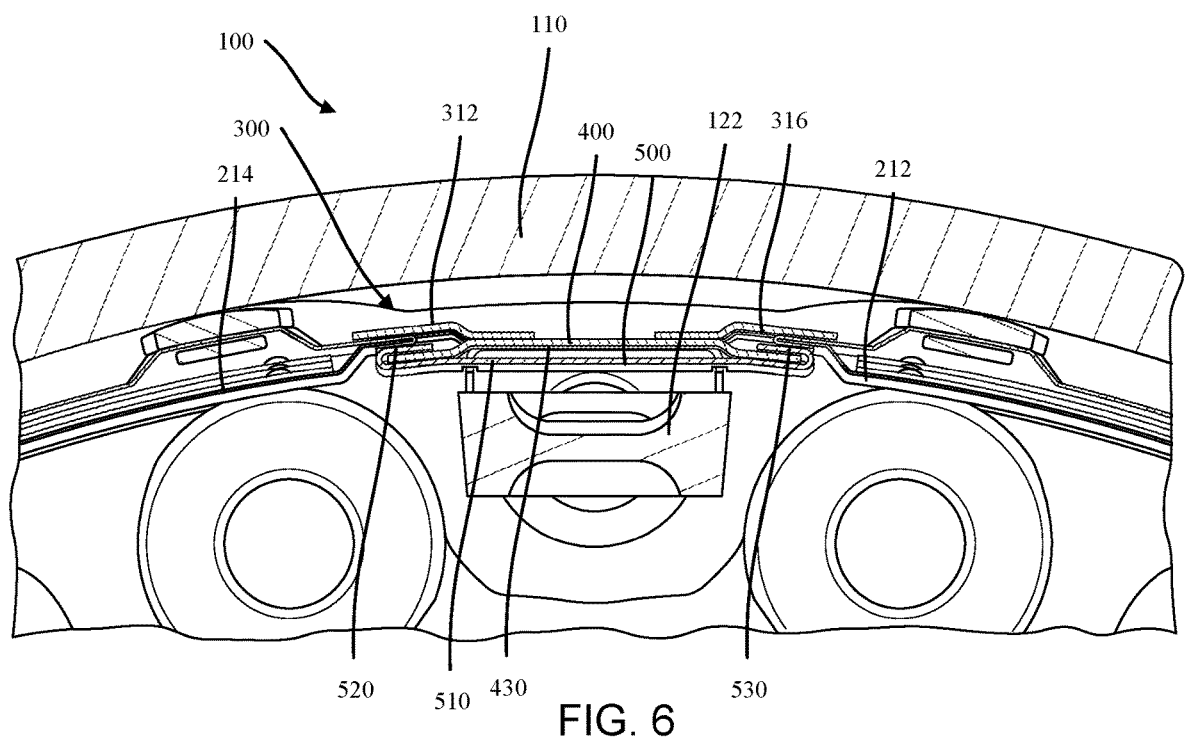
FIG. 6 illustrates a cross-sectional view of a wheel assembly, in accordance with various embodiments.

Referring now to FIG. 6, a cross-sectional view of a portion of the wheel assembly 100 from FIG. 1B is illustrated, in accordance with various embodiments. The heat shield retainer assembly 300 is disposed radially between a torque bar 122 in the plurality of torque bars 120 from FIG. 1B and circumferentially between a first heat shield segment 212 and a second heat shield segment 214 in the plurality of heat shield segments 210 from FIG. 2. The first heat shield segment 212 may be retained radially by the heat shield retainer assembly 300 between the first wing segment 312 in the plurality of wing segments 310 from FIG. 3 and the first axially extending hook 520 of the retainer sleeve 500. Similarly, the second heat shield segment 214 may be retained radially by the heat shield retainer assembly 300 between the third wing segment 316 in the plurality of wing segments 310 from FIG. 3 and the second axially extending hook 520 of the retainer sleeve 500.

In various embodiments, the flat plate 510 of the retainer sleeve 500 is disposed radially between the body portion 430 of the retainer main body 400 and the torque bar 122. In this regard, the retainer sleeve is disposed proximal a braking arrangement which is radially inward of the wheel assembly 100, in various embodiments. Thus, the retainer sleeve 500 may act as a heat shield to the retainer main body 400, which experiences the main structural loads of the heat shield retainer assembly 300, in various embodiments. In various embodiments, the retainer sleeve 500 may further protect the retainer main body 400 from thermal growth during operation.

In various embodiments, the heat shield retainer assembly 300 described herein may be configured to prevent a radial deflection of the heat shield retainer assembly 300 from being greater than or equal to a gap between the heat shield retainer assembly 300 and the inner wheel half 110. In this regard, the ribs 440, 450 from FIG. 4 may provide additional stiffness to the heat shield retainer assembly 300 and prevent radial deflections from causing the heat shield retainer assembly 300 from contacting the inner wheel half 110. In various embodiments, the ribs 440, 450 may further prevent wear of the heat shield retainer assembly 300 and damage to the inner wheel half 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retainer assembly for use in a wheel assembly, the retainer assembly comprising:
   a retainer main body having a first mounting flange, a second mounting flange, a body portion, a first rib and a second rib, the body portion extending from the first mounting flange to the second mounting flange, the first rib extending from the second mounting flange towards the first mounting flange, the second rib extending from the second mounting flange towards the first mounting flange, the first rib and the second rib extending orthogonal to the body portion;
   a retainer sleeve having a flat plate extending from a first axial end to a second axial end, the retainer sleeve having a first slot extending from the first axial end towards the second axial end and a second slot extending from the first axial end towards the second axial end, a portion of the first rib disposed in the first slot, and a portion of the second rib disposed in the second slot, the retainer sleeve further comprising:
   a first axially extending hook disposed on a first circumferential side of the flat plate and extending from the first axial end to the second axial end; and
   a second axially extending hook disposed on a second circumferential side of the flat plate and extending from the first axial end to the second axial end, the second circumferential side opposite the first circumferential side, wherein:
the first axially extending hook defines a first groove and the second axially extending hook defines a second groove, and
the first groove and the second groove configured to receive the body portion of the retainer main body.

2. The retainer assembly of claim 1, wherein:
the first rib and the second rib are configured to provide stiffness to the retainer assembly; and
the first slot and the second slot are sized and configured to provide substantially similar insulation properties for the retainer sleeve relative to a retainer sleeve without slots.

3. The retainer assembly of claim 1, wherein a plurality of wing segments are coupled to the retainer main body on a radial side opposite the retainer sleeve.

4. The retainer assembly of claim 1, wherein:
the retainer main body further comprises a first flange extending circumferentially from a first circumferential side of the body portion and a second flange extending circumferentially from a second circumferential side of the body portion, the second circumferential side opposite the first circumferential side,
the first flange is disposed in the first groove, and
the second flange is disposed in the second groove.

5. The retainer assembly of claim 1, further comprising:
a first wing segment and a second wing segment disposed on a first circumferential side of the retainer main body, the first wing segment spaced apart axially from the second wing segment; and
a third wing segment and a fourth wing segment disposed on a second circumferential side of the retainer main body, the third wing segment spaced apart axially from the second wing segment, the second circumferential side opposite the first circumferential side.

6. A wheel assembly, comprising:
an axially inner portion of a wheel;
a torque bar coupled to an outboard end of the axially inner portion of the wheel and coupled axially to an inboard end of the axially inner portion of the wheel;
a retainer assembly disposed between the torque bar and the axially inner portion of the wheel, the retainer assembly comprising:
a retainer main body having a body portion, a first mounting flange coupled to the axially inner portion of the wheel at the outboard end, a second mounting flange coupled to the axially inner portion of the wheel at the inboard end, the body portion extending axially from the first mounting flange to the second mounting flange, a first rib extending axially from the second mounting flange towards the first mounting flange and orthogonally from a first circumferential side of the body portion, and a second rib extending axially from the second mounting flange towards the first mounting flange and orthogonally from a second circumferential side of the body portion; and
a retainer sleeve coupled to the retainer main body, the retainer sleeve having a first axial slot and a second axial slot, the first rib disposed in the first axial slot, the second rib disposed in the second axial slot, the retainer sleeve further comprising:
a flat plate extending from a first axial end to a second axial end, the first axial slot extending from the first axial end towards the second axial end and the second axial slot extending from the first axial end towards the second axial end, a portion of the first rib disposed in the first axial slot, and a portion of the second rib disposed in the second axial slot;
a first axially extending hook disposed on a first circumferential side of the flat plate and extending from the first axial end to the second axial end, and
a second axially extending hook disposed on a second circumferential side of the flat plate and extending from the first axial end to the second axial end, the second circumferential side opposite the first circumferential side.

7. The wheel assembly of claim 6, wherein the flat plate of the retainer sleeve is disposed radially between the retainer main body and the torque bar.

8. The wheel assembly of claim 6, wherein:
the retainer assembly is separated from a radially inner surface of the axially inner portion of the wheel by a gap, and
the retainer assembly is configured to deflect less than the gap during operation of the wheel assembly.

9. The wheel assembly of claim 6, further comprising a first heat shield segment and a second heat shield segment, wherein the first heat shield segment is retained radially by the retainer assembly and the second heat shield segment is retained radially by the retainer assembly.

10. The wheel assembly of claim 6, wherein:
the first rib and the second rib are configured to provide stiffness to the retainer assembly; and
the first axial slot and the second axial slot are sized and configured to provide substantially similar insulation properties for the retainer sleeve relative to a retainer sleeve without slots.

11. The wheel assembly of claim 6, wherein a plurality of wing segments are coupled to the retainer main body on a radial side opposite the retainer sleeve.

12. The wheel assembly of claim 6, wherein the retainer assembly further comprises:
a first wing segment and a second wing segment disposed on a first circumferential side of the retainer main body, the first wing segment spaced apart axially from the second wing segment; and
a third wing segment and a fourth wing segment disposed on a second circumferential side of the retainer main body, the third wing segment spaced apart axially from the second wing segment, the second circumferential side opposite the first circumferential side.

13. A system for retaining adjacent heat shield segments, the system comprising:
an axially inner portion of a wheel;
a first heat shield segment disposed radially inward from the axially inner portion of the wheel;
a second heat shield segment disposed radially inward form the axially inner portion of the wheel;
a retainer assembly disposed circumferentially between the first heat shield segment and the second heat shield segment, the retainer assembly, comprising:
a retainer main body including:
a first mounting flange coupled to the axially inner portion of the wheel proximate an outboard end of the axially inner portion of the wheel;
a second mounting flange coupled axially to the axially inner portion of the wheel proximate an inboard end of the axially inner portion of the wheel;

a body portion extending from the first mounting flange to the second mounting flange;

a first rib extending axially from the second mounting flange towards the first mounting flange and orthogonally from the body portion proximate the first heat shield segment; and a second rib extending axially from the second mounting flange towards the first mounting flange and orthogonally from the body portion proximate the second heat shield segment; and a retainer sleeve having a flat plate disposed radially inward of the body portion, the flat plate extending from a first axial end to a second axial end, the flat plate including a first axial slot with a portion of the first rib disposed therein and a second axial slot with a portion of the second rib disposed therein, the retainer sleeve further comprising:

a first axially extending hook disposed on a first circumferential side of the flat plate and extending from the first axial end to the second axial end, and a second axially extending hook disposed on a second circumferential side of the flat plate and extending from the first axial end to the second axial end, the second circumferential side opposite the first circumferential side.

14. The system of claim 13, further comprising a torque bar disposed radially inward of the retainer assembly.

15. The system of claim 14, wherein the torque bar is coupled to the axially inner portion of the wheel by a fastener extending through the first mounting flange and the second mounting flange into the axially inner portion of the wheel.

16. The system of claim 14, wherein the flat plate of the retainer sleeve is disposed radially between the retainer main body and the torque bar.

17. The system of claim 13, wherein:

the retainer assembly is separated from a radially inner surface of the axially inner portion of the wheel by a gap, and the retainer assembly is configured to deflect less than the gap during operation of a wheel assembly for the system.

18. The system of claim 13, wherein the retainer assembly further comprises:

a first wing segment and a second wing segment disposed on a first circumferential side of the retainer main body, the first wing segment spaced apart axially from the second wing segment; and a third wing segment and a fourth wing segment disposed on a second circumferential side of the retainer main body, the third wing segment spaced apart axially from the second wing segment, the second circumferential side opposite the first circumferential side.

* * * * *